United States Patent
Ito et al.

(10) Patent No.: US 7,535,461 B2
(45) Date of Patent: May 19, 2009

(54) INFORMATION PROCESSING APPARATUS, CONTROL METHOD THEREFOR, AND PROGRAM

(75) Inventors: Masato Ito, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/992,756

(22) Filed: Nov. 22, 2004

(65) Prior Publication Data
US 2005/0116938 A1    Jun. 2, 2005

(30) Foreign Application Priority Data
Dec. 1, 2003    (JP)    ............... 2003-401632

(51) Int. Cl.
G06F 3/041    (2006.01)
G06K 9/46    (2006.01)

(52) U.S. Cl. .................. 345/173; 345/179; 382/203

(58) Field of Classification Search .......... 345/173–181
See application file for complete search history.

(56) References Cited

U.S. PATENT DOCUMENTS

| | | | |
|---|---|---|---|
| 5,548,745 A | 8/1996 | Egan et al. | 395/500 |
| 5,627,567 A | 5/1997 | Davidson | 345/173 |
| 5,757,358 A | 5/1998 | Osga | 715/862 |
| 6,157,379 A | 12/2000 | Singh | 715/866 |
| 6,259,436 B1 * | 7/2001 | Moon et al. | 345/173 |
| 2002/0092013 A1 | 7/2002 | Delo | 717/174 |
| 2003/0187877 A1 | 10/2003 | Kuboyama et al. | 707/104.1 |
| 2004/0107223 A1 | 6/2004 | Uno et al. | 707/200 |

FOREIGN PATENT DOCUMENTS

| | | |
|---|---|---|
| CN | 1331815 | 1/2002 |
| EP | 822529 | 2/1998 |
| JP | 05-066885 | 3/1993 |
| JP | 9-146705 | 6/1997 |
| JP | 11-161427 | 6/1999 |

* cited by examiner

*Primary Examiner*—Duc Q Dinh
(74) *Attorney, Agent, or Firm*—Fitzpatrick, Cella, Harper & Scinto

(57) ABSTRACT

Input interpretation information describing rules for interpreting the intentions of inputs is held in an indication input interpretation grammar holding unit. An input to a coordinate input region is detected by a pen input detection unit. The intention of an input detected by referring to the input interpretation information is interpreted by a grammar parsing unit. The confidence score of the interpretation result is calculated by a confidence score calculation unit. A certainty-factor-attached N-best output unit outputs the interpretation result together with the confidence score.

10 Claims, 13 Drawing Sheets

FIG. 4

```
<rule id="root">

<one-of>

<tap inside-rect="x="110",y="10",width="80",height="20") ⎫
                                                         ⎬ 401
    tag="$station='shibuya'" />                          ⎭

<tap inside-rect="x="110",y="60",width="80",height="20") ⎫
                                                         ⎬ 402
    tag="$station='ebisu'" />                            ⎭

<tap inside-rect="x="0",y="0",width="200",height="100")  ⎫
                                                         ⎬ 403
    tag="$area='tokyo'" />                               ⎭

</one-of>

</rule>
```

FIG. 9

```
<rule id= "root" >
<one-of>
<tap inside-path= "(x1,y1)(x2,y2)(x3,y3)(x4,y4)(x5,y5)(x6,y6)"    ⎫
    tag= "$station= 'shibuya' " />                                 ⎬ 901
<tap inside-rect= x= "0" ,y= "0" ,width= "200" ,height= "100" )    ⎫
    tag= "$area= 'tokyo' " />                                      ⎬ 902
</one-of>
</rule>
```

FIG. 11

```
<rule id="root">
<one-of>
<tap inside-circle="cx="100",cy="100",r="10")"        ⎫ 1101
    tag="$station='shibuya'" />                        ⎭
<tap inside-ellipse="cx="100",cy="130",rx="20",ry="10")"  ⎫ 1102
    tag="$station='ebisu'" />                          ⎭
</one-of>
</rule>
```

✕ TAPPED POINT

✕ TAPPED POINT

INFORMATION PROCESSING APPARATUS, CONTROL METHOD THEREFOR, AND PROGRAM

FIELD OF THE INVENTION

The present invention relates to an information processing apparatus, a control method therefor, and a program which interpret the intention of an input on the basis of the input to a coordinate input region.

BACKGROUND OF THE INVENTION

There have been proposed several techniques of interpreting the intention of an input entered through a touch panel or touch pen and supporting the input.

For example, Japanese Patent Laid-Open No. 11-161427 has proposed a technique of correcting an input deviation from an input target region on a touch panel by converting input point coordinates on the basis of the past input history and the amount of deviation from the target region.

In addition, Japanese Patent Laid-Open No. 9-146705 has proposed a technique of preferentially selecting one of a plurality of buttons (target regions) pressed on a touch panel which is higher in the degree of importance or larger in the contact area of the finger pressed.

However, no schemes based on conventional techniques can develop highly flexible applications which can interpret the intention of a user's indication with a confidence score more naturally by describing interpretation rules for the intentions of user's indications as a grammar even if target regions as indication targets overlap or the target region intended by the user slightly deviates from the indicated position.

Under such circumstances, the technique disclosed in Japanese Patent Laid-Open No. 11-161427 can correct an input deviation with respect to a target region. According to Japanese Patent Laid-Open No. 9-146705, when a plurality of target regions are selected, the region intended by the user can be determined by using the degrees of importance of the target regions or the contact areas of the finger at the time of input operation.

According to these references, however, interpretation rules for the intentions of user's indications cannot be described as a grammar, and hence the intentions of user's indications cannot be interpreted with confidence scores.

SUMMARY OF THE INVENTION

The present invention has been made to solve the above problem, and has as its object to provide an information processing apparatus, a control method therefore, and a program which can flexibly interpret the intention of an input more properly.

According to the present invention, the foregoing object is attained by an information processing apparatus comprising: display control means for controlling to display a plurality of regions on a display area; detection means for detecting an input to the display area; calculation means for calculating confidence scores of the plurality of regions on the basis of a relationship between the region and the input detected by the detection means regardless of whether the input is included in the region; and output means for outputting information corresponding to the region on the basis of the confidence score.

In a preferred embodiment, the input to the display area is an input point, and the calculation means calculates the confidence score on the basis of a positional relationship between the region and an input position of the input point.

In a preferred embodiment, the calculation means calculates the confidence score on the basis of the positional relationship and a size of the region.

In a preferred embodiment, the calculation means further calculates the confidence score on the basis of a size of a smallest region among the plurality of regions.

In a preferred embodiment, the apparatus further comprises determination means for determining whether the input position of the input point detected by the detection means falls inside or outside the region, wherein the calculation means calculates the confidence score on the basis of the determination result obtained by the determination means.

In a preferred embodiment, the apparatus further comprises decision means for deciding a representative point of the region, wherein the positional relationship between the region and the input position of the input point detected by the detection means is a distance between the input position and the representative point decided by the decision means.

In a preferred embodiment, the apparatus further comprises determination means for determining whether the input position of the input point detected by the detection means falls inside or outside the region, wherein the calculation means converts the input position of the input point detected by the detection means in accordance with a shape of the processing target region and calculates the confidence score on the basis of a distance between the converted input position and a representative point of the processing target region.

In a preferred embodiment, the apparatus further comprises: determination means for determining whether the input position of the input point detected by the detection means falls inside or outside the region; and decision means for deciding a representative point of the region, wherein the calculation means inhibits calculation of the confidence score when the determination result obtained by the determination means indicates that the input position falls outside the processing target region, and a distance between the representative point of the processing target region and the input position is not less than a predetermined value.

In a preferred embodiment, the apparatus further comprises second display control means for controlling to display information corresponding to the region on the basis of the confidence score output from the output means.

In a preferred embodiment, the input to the display area is an input to an input region, and the calculation means calculates the confidence score on the basis of a positional relationship between the input region and the region.

In a preferred embodiment, the input to the display area is an input to an input region, and the calculation means calculates the confidence score on the basis of a size of the region included in the input region.

In a preferred embodiment, the apparatus further comprises decision means for deciding a representative point of the input region and a representative point of the region, wherein the calculation means calculates the confidence score on the basis of a distance between the representative point of the input region and the representative point of the region.

In a preferred embodiment, the apparatus further comprises reference means for referring to input interpretation information including a description concerning the plurality of regions, wherein the calculation means calculates the confidence score on the basis of a relationship between the input and the region which is acquired by using the input interpretation information referred to by the reference means.

According to the present invention, the foregoing object is attained by providing an information processing method comprising: a display control step of controlling to display a plurality of regions on a display area; a detection step of detecting an input to the display area; a calculation step of calculating confidence scores of the plurality of regions on the basis of a relationship between the region and the input detected in the detection step regardless of whether the input is included in the region; and an output step of outputting information corresponding to the region on the basis of the confidence score.

According to the present invention, the foregoing object is attained by providing a program comprising: a program code for a display control step of controlling to display a plurality of regions on a display area; a program code for a detection step of detecting an input to the display area; a program code for a program code for a calculation step of calculating confidence scores of the plurality of regions on the basis of a relationship between the region and the input detected in the detection step regardless of whether the input is included in the region; and a program code for an output step of outputting information corresponding to the region on the basis of the confidence score.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of a grammar which allocates the descriptions of semantic interpretations to regions according to the first embodiment of the present invention;

FIG. 9 is a view showing an example of a grammar which allocates the descriptions of semantic interpretations to regions according to the second embodiment of the present invention;

FIG. 11 is a view showing an example of a grammar which allocates the descriptions of semantic interpretations to regions according to the third embodiment of the present invention;

DETAILED DESCRIPTION OF THE PREFERRED EMBODIMENTS

Preferred embodiments of the present invention will be described in detail in accordance with the accompanying drawings.

First Embodiment

The first embodiment will exemplify an information processing apparatus which, when a user taps (gives an instruction or input) on an arbitrary place on a tablet (coordinate input region) with a touch pen in, for example, a tablet PC (personal computer) (or a PC with a touch panel), calculates, for each of M target regions displayed on the screen, a confidence score of each region which indicates the degree of intention with which the input point coordinates were intended to indicate.

Figure 1:
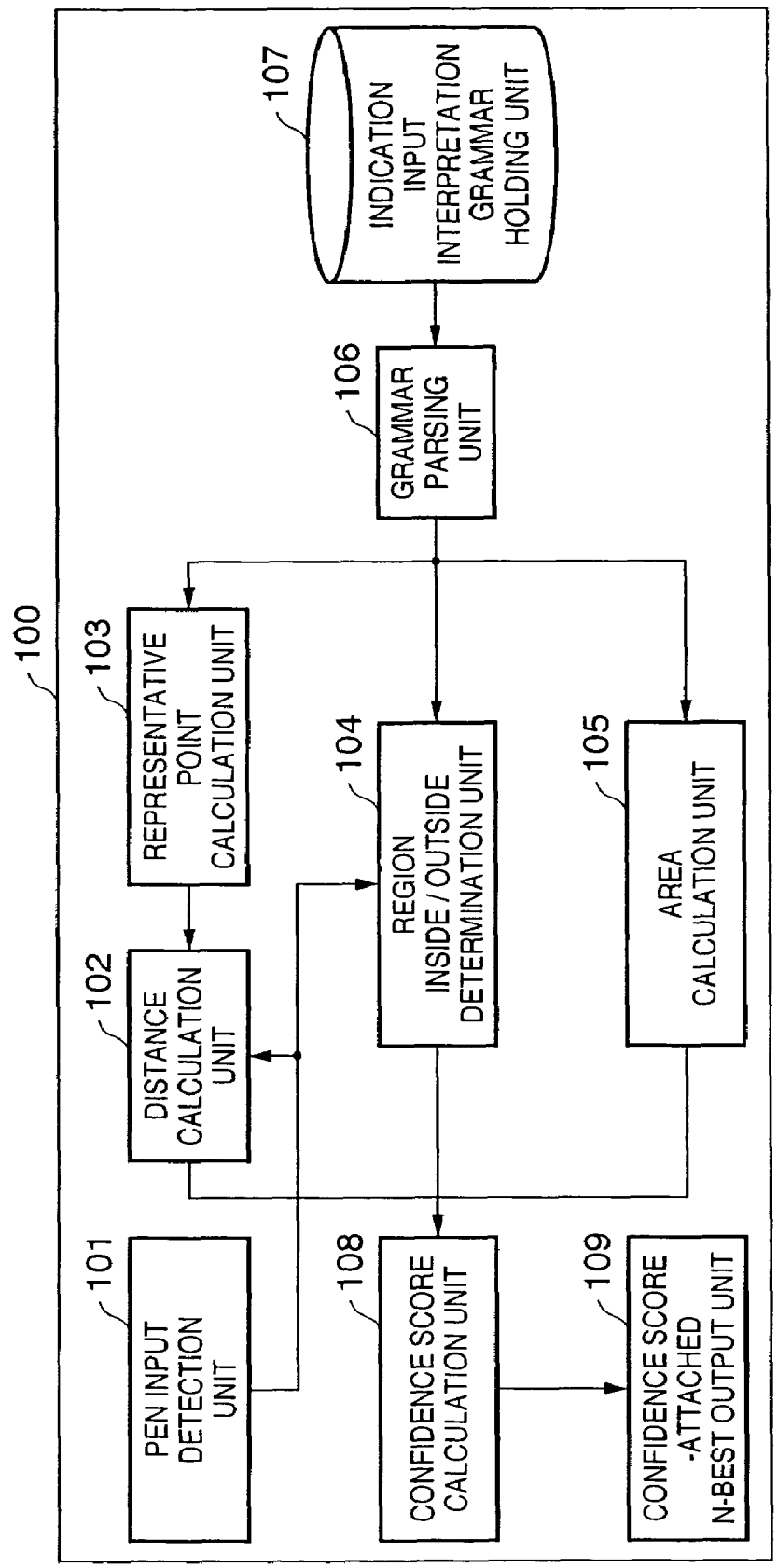
FIG. 1 is a block diagram showing the functional arrangement of an information processing apparatus according to the first embodiment of the present invention.

FIG. 1 is a block diagram showing the functional arrangement of the information processing apparatus according to the first embodiment of the present invention.

Referring to FIG. 1, the information processing apparatus functions as a tablet PC 100. Reference numeral 101 denotes a pen input detection unit. When the user performs input operation with the touch pen, the pen input detection unit 101 transmits the input point coordinates to a distance calculation unit 102 and region inside/outside determination unit 104.

The distance calculation unit 102 calculates the distance between the input point coordinates detected by the pen input detection unit 101 and the coordinates of a representative point calculated by a representative point calculation unit 103, and transmits the calculation result (distance) to a confidence score calculation unit 108.

The representative point calculation unit 103 calculates a representative point with respect to the region obtained from a grammar parsing unit 106, and transmits the calculation result (representative point) to the distance calculation unit 102.

The region inside/outside determination unit 104 determines whether the input point coordinates detected by the pen input detection unit 101 fall inside or outside the region obtained from the grammar parsing unit 106, and transmits the determination result to the confidence score calculation unit 108.

Reference numeral 105 denotes an area calculation unit which calculates the area of the region obtained by the grammar parsing unit 106, and transmits the calculation result (area) to the confidence score calculation unit 108. The grammar parsing unit 106 interprets the indication input interpretation grammar held in an indication input interpretation grammar holding unit 107.

The indication input interpretation grammar holding unit 107 holds an indication input interpretation grammar which describes rules for interpreting intentions with which the user tried to perform input operation.

The confidence score calculation unit 108 calculates a confidence score indicating the degree of intention with which a user's indication input indicated a given region on the basis of the data received from the representative point calculation unit 103, region inside/outside determination unit 104, and area calculation unit 105.

Reference numeral 109 denotes a certainty-factor-attached N-best output unit, which outputs the N-best confidence scores of the confidence scores of the respective regions calculated by the confidence score calculation unit 108.

The hardware arrangement of the tablet PC 100 will be described next with reference to FIG. 2.

Figure 2:
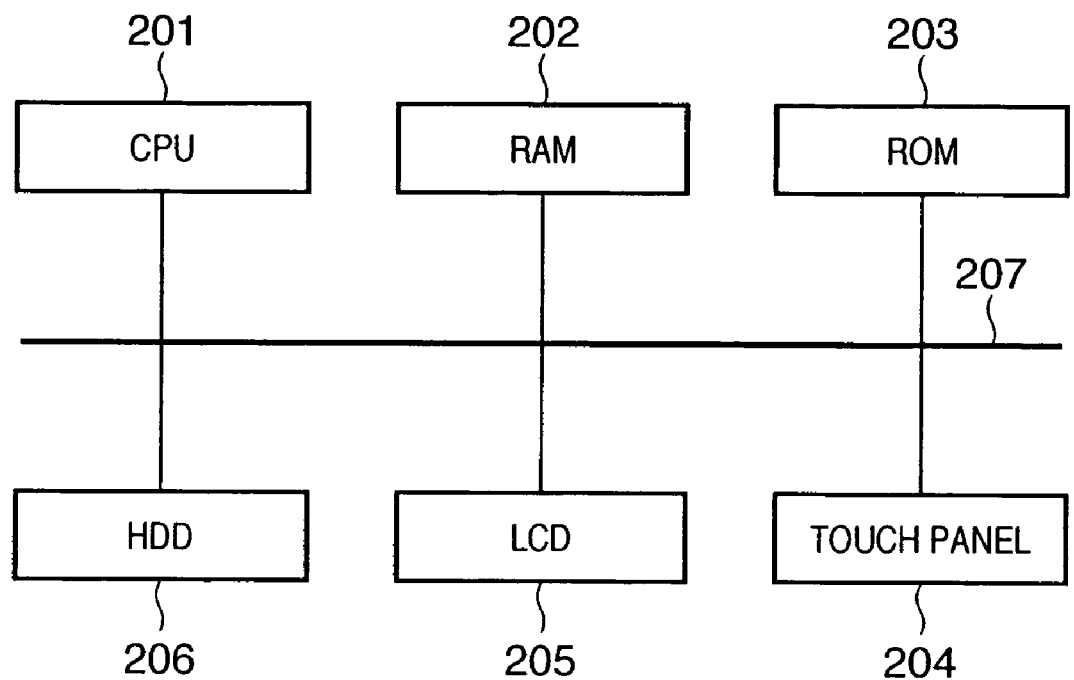
FIG. 2 is a block diagram showing the hardware arrangement of a tablet PC according to the first embodiment of the present invention.

FIG. 2 is a block diagram showing the hardware arrangement of the tablet PC according to the first embodiment of the present invention.

Referring to FIG. 2, reference numeral 201 denotes a CPU, which operates in accordance with various kinds of control programs including programs for implementing the sequences described later, and realizes overall control on the tablet PC 100.

Reference numeral 202 denotes a RAM, which functions as a work area necessary for the operation of each control program and a temporary save area for data; and 203, a ROM, which holds various kinds of control programs including programs for implementing sequences to be described later.

Reference numeral 204 denotes a touch panel, which receives a data input (to be described laser) from the user through a dedicated pen (touch pen) or user's finger; and 205, an LCD which displays various kinds of images such as an operation window having input target regions generated by contents (to be described later) or the like. Note that a CRT or another display may be used in place of the LCD 205.

Reference numeral 206 denotes an HDD (Hard Disk Drive), which holds various data such as the data of contents to be described later; and 207, a bus, which mutually connects the respective constituent elements.

The processing implemented by the tablet PC 100 in the first embodiment will be described next.

Figure 3:
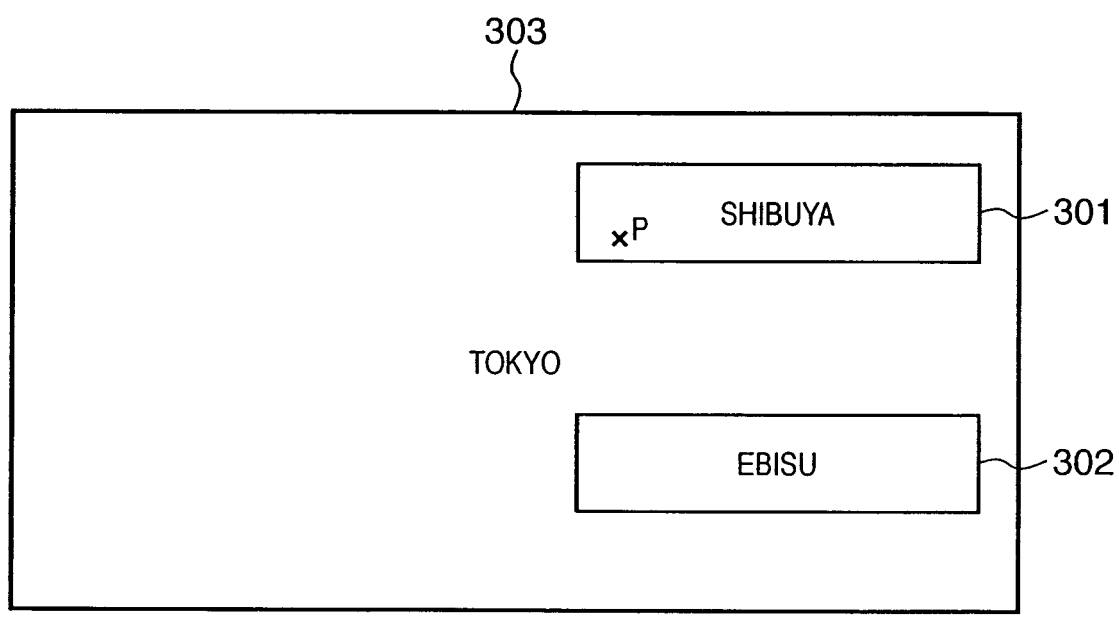
FIG. 3 is a view showing an example of an operation window according to the first embodiment of the present invention.

Assume that the tablet PC 100 is displaying an operation window like that shown in FIG. 3 on the LCD 205. This operation window is implemented by, for example, executing contents described in a markup language using a browser.

The operation window in FIG. 3 functions as an operation window for designating a zone or spot. Referring to FIG. 3, in particular, this window is comprised of a rectangular region 301 for designating "Shibuya station", a rectangular region 302 for designating "Ebisu station", and a rectangular region 303 for designating "Tokyo". In this case, the regions 301 and 302 are superimposed on the region 303.

FIG. 4 shows a description example of an input interpretation grammar (to be simply referred to as a grammar hereinafter) which is a set of rules for interpretation of the intentions of user's indication inputs to the operation window in FIG. 3.

In this manner, the input interpretation grammar is described such that the descriptions of the respective regions and the descriptions of semantic interpretations to be made when the corresponding regions are indicated are allocated.

An example of a grammar which describes a rule for interpreting the intention of an indication input to the operation window in FIG. 3 will be described with reference to FIG. 4.

FIG. 4 is a view showing an example of a grammar which allocates the descriptions of semantic interpretations to regions according to the first embodiment of the present invention.

Note that a case wherein this grammar is held in the indication input interpretation grammar holding unit 107 will be exemplified. However, the present invention is not limited to this. For example, another apparatus on a network may hold the grammar.

Referring to FIG. 4, reference numeral 401 denotes a description indicating a rectangular region (301 in FIG. 3) with the coordinates of the left end represented by (x, y)= (110, 10), a width of 80, and a height of 20. The description of the semantic interpretation "tag="$station='shibuya'"" is allocated to this region.

This description indicates that when a user's input is intended to indicate this region, it is interpreted that the user "has indicated Shibuya station".

Likewise, reference numeral 402 in FIG. 4 denotes a description indicating a rectangular region (302 in FIG. 3) with the coordinates of the left end represented by (x, y)= (110, 60), a width of 80, and a height of 20. The description of the semantic interpretation "tag="$station='ebisu'"" is allocated to this region.

This description indicates that when a user's input is intended to indicate this region, it is interpreted that the user "has indicated Ebisu station".

Likewise, reference numeral 403 in FIG. 4 denotes a description indicating a rectangular region (303 in FIG. 3) with the coordinates of the left end represented by (x, y)=(0, 0), a width of 200, and a height of 100. The description of the semantic interpretation "tag="$area='tokyo'"" is allocated to this region.

This description indicates that when a user's input is intended to indicate this region, it is interpreted that the user "has indicated the Tokyo area".

Note that the tag "<one-of >" in FIG. 4 indicates that it is interpreted that the user's input is intended to indicate one of these regions.

The indication input interpretation grammar shown in FIG. 4 is comprised of information including at least a description indicating an arbitrary input target region on the touch panel 204 (coordinate input region) and the description of data to be output, when an input to the input target region is detected, as a result of interpreting the intention of the input.

The processing executed by the system according to the first embodiment will be described with reference to FIG. 5.

Figure 5:
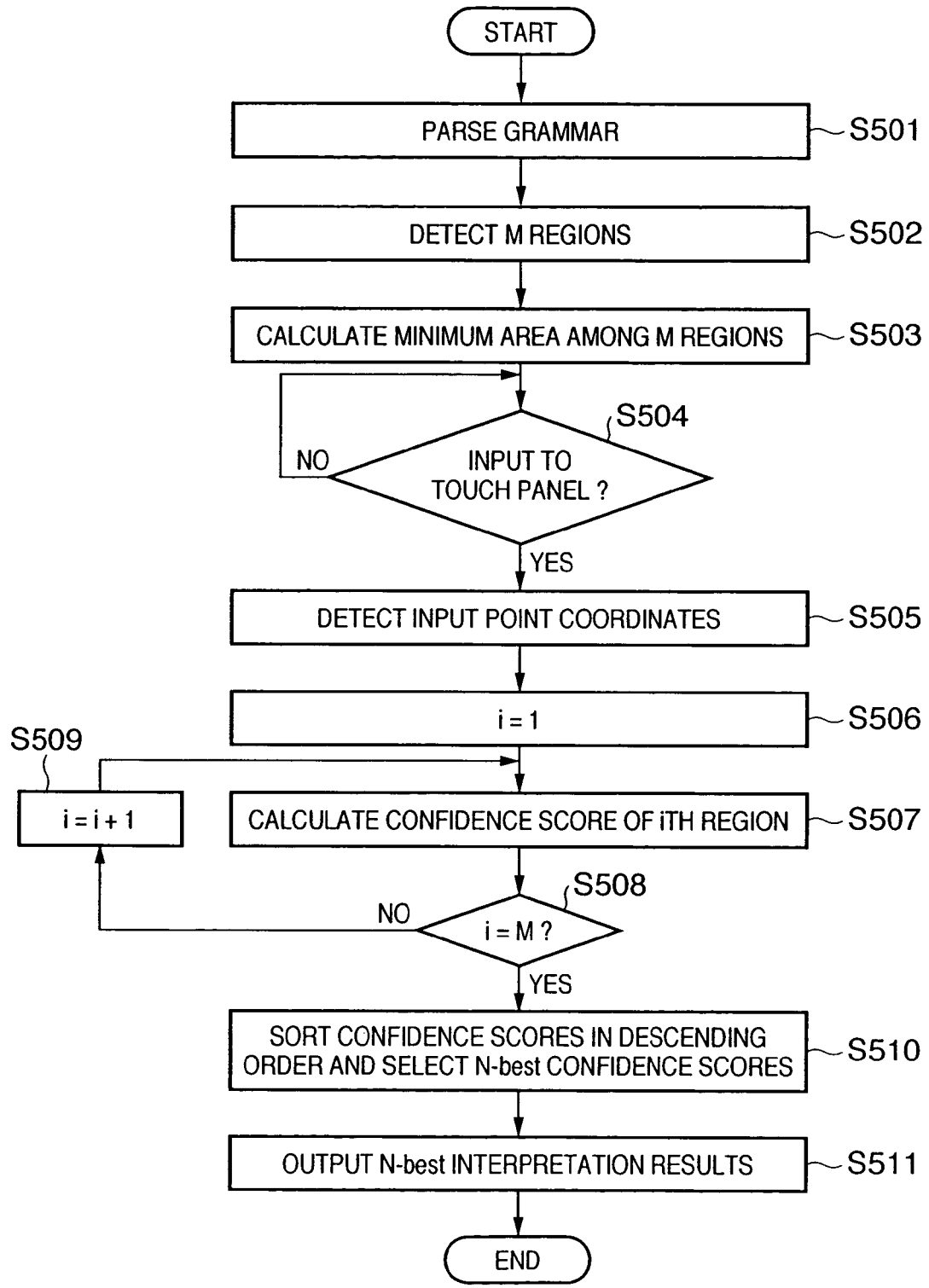
FIG. 5 is a flowchart showing the processing executed by the system according to the first embodiment of the present invention.

FIG. 5 is a flowchart showing the processing executed by the system according to the first embodiment of the present invention.

Note that the processing in FIG. 5 is implemented under the control of the CPU 201.

First of all, the tablet PC 100 interprets the grammar by using the grammar parsing unit 106 (step S501). The tablet PC 100 detects the M regions (M is one or more) for which the grammar is described, on the basis of the interpretation result (step S502), and stores the information of each region (e.g., the coordinates, width, and height) in the RAM 202.

The tablet PC 100 then causes the area calculation unit 105 to calculate the area of each of the M regions on the basis of the information of each region defined in the grammar, calculates the minimum value of the calculated areas, and stores the minimum value as Smin in the RAM 202 (step S503).

Subsequently, the tablet PC 100 waits for a user's input (step S504). When the user performs input operation at a given point on the touch panel 204 of the tablet PC 100 with the touch pen, the tablet PC 100 detects the input to the touch panel 204 by using the pen input detection unit 101 (YES in step S504). The tablet PC 100 detects the input point coordinates input by the user on the basis of the detection result (step S505).

The tablet PC 100 calculates, for each of the M regions, a confidence score indicating whether the user's input coincides with the region intended by the user, on the basis of the detected input point coordinates.

First of all, the tablet PC 100 assigns 1 (i=1) to a counter variable i for counting the number of regions to reset the counter variable (step S506). The tablet PC 100 causes the confidence score calculation unit 108 to calculate the confidence score of the ith region (step S507). A confidence score Ci indicating whether input point coordinates (x0, x0) input by the user is intended to indicate the ith region (to be referred to as a region i hereinafter) is calculated according to the following equation:

$$Ci = L * Smin/Si \quad (1)$$

where Si is the area of the region i, and Smin is the minimum value among the areas of the M regions calculated in step S503. In the first embodiment, when a region with the smallest area is selected in this manner, normalization is performed to set Smin/Si to 1. Therefore, the confidence score Ci decreases as the area of a processing target region increases, and vice versa.

Figure 6:
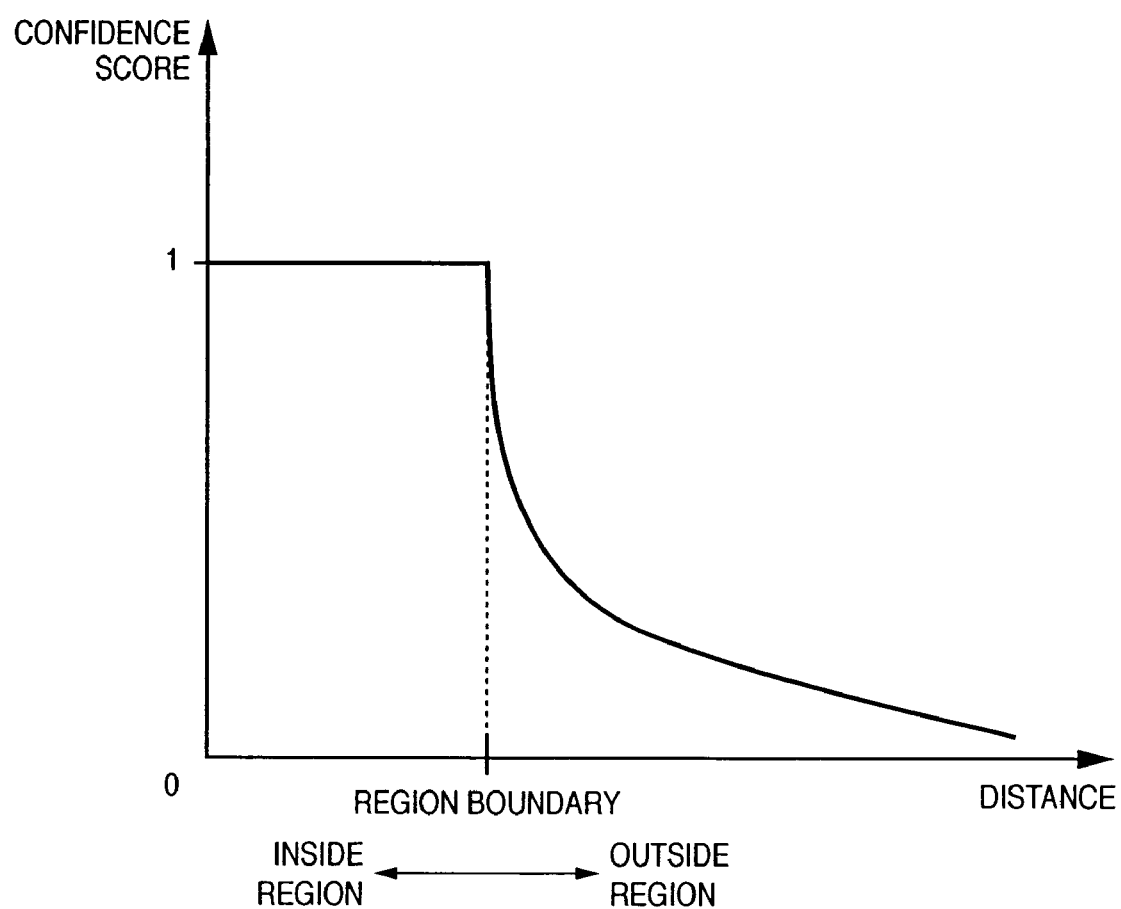
FIG. 6 is a graph showing the relationship between an input point and the representative point of a target region according to the first embodiment of the present invention.

In addition, L is the determination result value obtained by the region inside/outside determination unit 104. When the input point coordinates (x0, y0) fall inside the region i, L is set to "1", whereas when the coordinates fall outside the region, L is set to "1/d" (where d is the distance between the representative point of the input point coordinates (x0, y0) and that of the region i). According to the characteristics of L plotted in, for example, FIG. 6, the confidence score remains 1 until the distance from the representative point of the region reaches the boundary of the region, and decreases in reverse proportion to the distance from the representative point of the region after the distance exceeds the boundary.

A representative point is a point representing a region, and is, for example, the center of gravity of the region. Any point can be set as a representative point as long as it represents a region. For example, that point of points on the region which is located at the shortest distance from the input point may be used as a representative point. In this case, a representative point is the barycentric point, of a region. This representative point is calculated by the representative point calculation unit 103.

Upon calculation for the ith region, the tablet PC 100 compares the counter variable i with a total region count M to check whether they coincide with each other (step S508). If i=M (YES in step S508), the flow moves to step S510. If i ≠ M (NO in step S508), i is incremented by one (step S509), and the flow returns to step S507.

The processing in steps S507 to S509 is repeated until the confidence score of the Mth region is calculated in the above manner.

Upon completion of calculation up to the confidence score of the Mth region, the tablet PC 100 causes the certainty-factor-attached N-best output unit 109 to sort the calculated confidence scores of the respective regions in descending order, and selects N-best (N is one or more) values (step S510). The tablet PC 100 then outputs the N-best interpretation results as processing results on the contents (step S511).

In this case, the area S of each region is calculated on the basis of the width and height described in the grammar. That is, S=width×height is calculated.

In the determination performed by the region inside/outside determination unit 104, letting (xp, yp) be the coordinates of the upper left end of a given region described in the grammar, the coordinates of the lower right end are expressed by (xq, yq)=(xp+width, yp+height). In this case, if the input point coordinates (x0, y0) fall inside the ranges of xp≦x0≦xq and yp≦y0≦yq, it is determined that the input point coordinates fall inside the region.

As a representative point, the coordinates of the center of gravity of each region are calculated as (x, y)=(xp+width/2, yp+height/2).

A concrete example of the processing in FIG. 5 will be described next with reference to FIGS. 3 and 4.

When the grammar parsing unit 106 interprets the grammar in FIG. 4 in step S501, the three regions 301 to 303 (FIG. 3) are detected in step S502. In step S503, the area calculation unit 105 calculates the minimum value among the areas of these regions. In this case, 1,600, 1,600, and 20,000 are the calculated areas of the regions 301, 302, and 303, respectively. Therefore, 1,600 is the minimum value Smin among the areas of the regions 301 to 303.

In step S504, the flow waits for an input from the user. Assume that in this case, a point P in FIG. 3 is input. Assume that in response to this input, the pen input detection unit 101 detects (x0, y0)=(120, 25) as the input point coordinates in step S505.

The confidence score of each region is then calculated.

First of all, in step S506, 1 is assigned to i. In step S507, the confidence score calculation unit 108 calculates a confidence score C1 of the region 301 which is the first region.

According to equation (1), since the input point coordinates (x0, y0) fall inside the region 301, L is 1 and Smin/S1 is 1. The confidence score C1 of the region 301 is therefore 1.

The flow moves to step S508. In this case, i=1, M=3, and i ≠ M. Therefore, in step S509, i is incremented by one to set i=2. The flow then returns to step S507, in which the confidence score calculation unit 108 calculates a confidence score C2 of the region 302 which is the second region.

According to equation (1), since the input point coordinates (x0, y0) fall outside the region 302, L is 1/d. In addition, since the representative point (the coordinates of the center of gravity) are (150, 70), the distance from the input coordinates (x0, y0)=(120, 25) is about 54.0, and 1/d is about 0.018. Furthermore, Smin/S2 is 1, and the confidence score C2 of the region 302 is about 0.018.

The flow then moves to step S508. In this case, i=2, M=3, and i ≠ M. In step S509, therefore, i is incremented by one to set i=3. The flow returns to step S507, in which the confidence score calculation unit 108 calculates a confidence score C3 of the region 303 which is the third region.

According to equation (1), since the input point coordinates (x0, y0) fall inside the region 303, L is 1. In addition, Smin/S3 is 0.08, and the confidence score C3 of the region 303 is 0.08.

The flow moves to step S508. In this case, i=3, M=3, and i=M. The flow therefore moves to step S510.

In step S510, the confidence scores of the regions 301 to 303 are sorted in descending order into C1, C3, and C2. N-best selection is then performed in descending order. Note that in the first embodiment, the top three values are selected.

In step S511, the N-best interpretation results which are the processing results in the step S510 are output.

An output example of the N-best interpretation results will be described with reference to FIG. 7.

Figure 7:
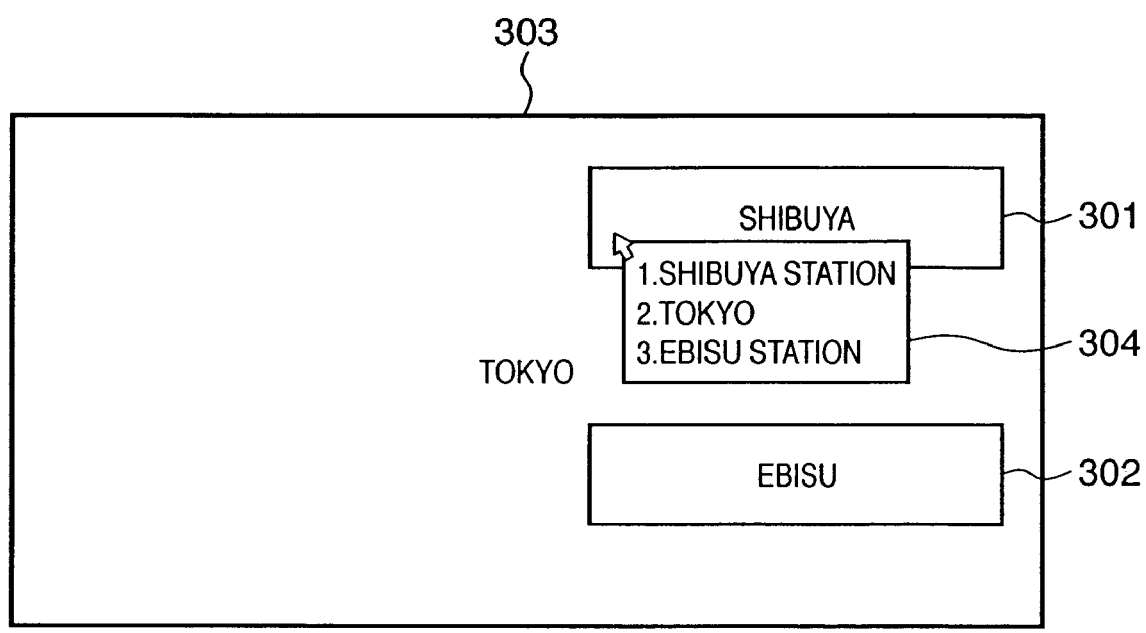
FIG. 7 is a view showing an output example of N-best interpretation results according to the first embodiment of the present invention.

FIG. 7 is a view showing an output example of the N-best interpretation results in the first embodiment of the present invention.

FIG. 7 shows a state wherein a menu 304 for the selection of a target region is displayed as N-best interpretation results. In this menu 304, target region candidates which the user intends to input are displayed in descending order of confidence scores (C1, C3, C2). That is, in the menu 304, the target region candidates (region names) which the user intends to input are displayed in the order of "Shibuya station", "Tokyo", and "Ebisu station".

The user can finally select the target region which he/she intends to input by selecting the desired region name in the menu 304.

Note that the output example in FIG. 7 is just an example, and other controls such as radio buttons, check boxes, or selection buttons can be used in place of the menu. Alternatively, a voice input function may be provided, and one of N-best interpretation results may be automatically confirmed in combination with the voice information input by the voice input function.

Consider, for example, a case wherein the user inputs "let me know the weather here" by voice while tapping on a window like the one described above with a pen. This input voice is subjected to voice recognition processing, and the system understands that the user wants to know the weather. Since what "here" indicates is unclear from the voice alone, the corresponding information is provided by pen input. As described above, the pen input interpretation results are obtained as N-best with confidence scores.

In the above description, the pen input interpretations are the 3-best interpretations, namely "Shibuya station", "Tokyo", and "Ebisu station". Since a proper interpretation of "here" of "weather here" indicates "area" rather than "station", the second interpretation is selected. The system therefore interprets that the user wants to know "the weather in Tokyo". Likewise, with regard to the voice input "tell me the fastest way to go here", the system selects the pen input interpretation "Shibuya" and interprets that the user wants to know the way to go to Shibuya station".

As described above, according to the first embodiment, a highly flexible user interface can be developed, which can interpret the intention of a user's input with a confidence score more naturally by describing interpretation rules for the intentions of user's inputs as a grammar even if target regions as input targets overlap or the target region intended by the user slightly deviates from the indicated position.

Second Embodiment

The first embodiment has exemplified the case wherein the target regions on the coordinate input region are formed from rectangular regions. However, such target regions may be formed from polygons. The second embodiment will exemplify the processing to be performed when target regions are formed from polygons.

In the second embodiment, the window shown in FIG. 8 will be described as an operation window example displayed by a tablet PC 100.

Figure 8:
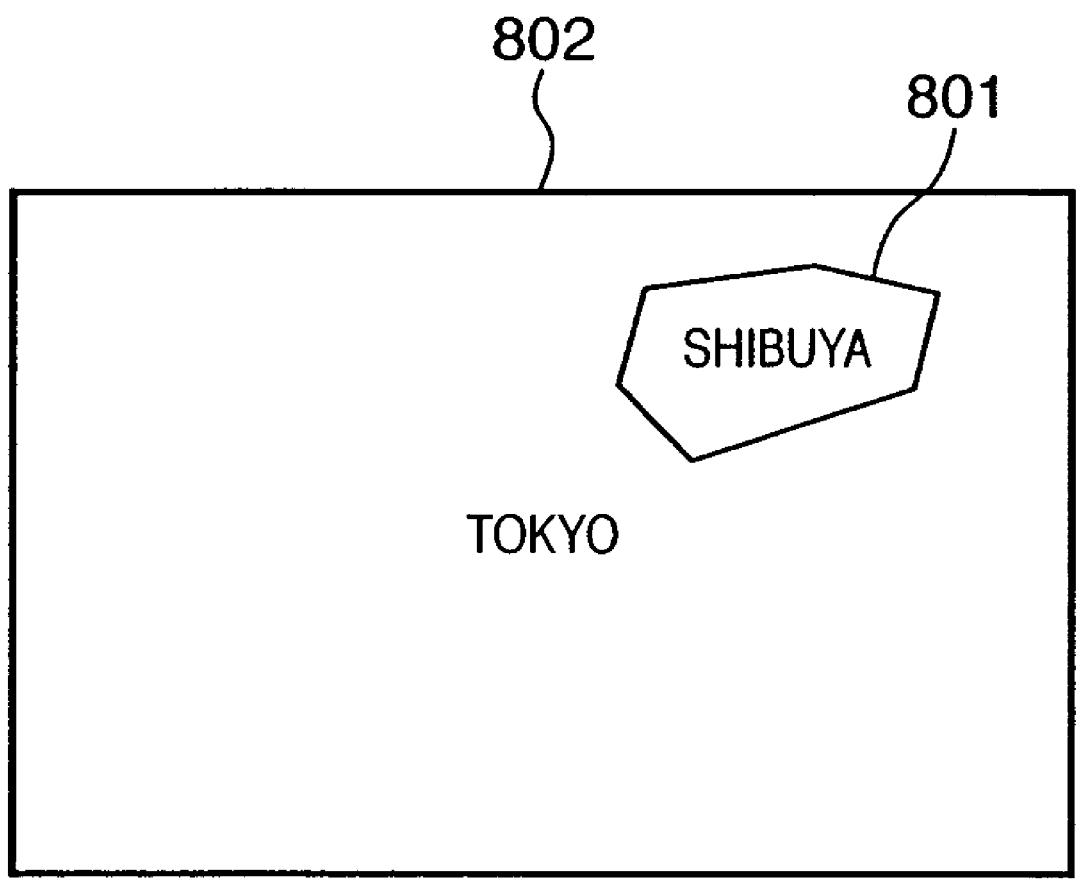
FIG. 8 is a view showing an example of an operation window according to the second embodiment of the present invention.

FIG. 8 is a view showing an example of the operation window according to the second embodiment of the present invention.

The operation window in FIG. 8 functions as an operation window for designating a zone or spot. Referring to FIG. 8, in particular, this window is comprised of a polygonal region 801 for designating "Shibuya station" and a rectangular region 802 for designating "Tokyo".

In addition, contents corresponding to the respective regions which implement this operation window include a grammar which allocates the descriptions of semantic interpretations to the respective regions as shown in FIG. 9.

An example of the grammar which allocates the descriptions of semantic interpretations to the regions in the contents which implement the operation window in FIG. 8 will be described with reference to FIG. 9.

FIG. 9 is a view showing an example of the grammar which allocates the descriptions of semantic interpretations to the regions according to the second embodiment of the present invention.

A description of portions common to the grammar in FIG. 4 in the first embodiment will be omitted.

Referring to FIG. 9, reference numeral 901 denotes a description indicating a polygonal region (801 in FIG. 8) with coordinates (x1, y1), (x2, y2), . . . , (x6, y6) being defined as vertex coordinates, respectively. The description of the semantic interpretation "tag="$station='shibuya'"" is allocated to this region.

This description means that when a user's input is intended to indicate this region, it is interpreted that the user "has indicated Shibuya station".

A description 902 in FIG. 9 corresponds to the description 403 in FIG. 4, and a description thereof will be omitted.

In the second embodiment, when the processing in FIG. 5 in the first embodiment is to be performed, processing for polygonal regions is also executed.

Processing to be performed when polygonal regions are processed will be described with reference to FIG. 5.

Assume that an area S of a polygonal region is to be calculated by an area calculation unit 105. In this case, letting (x1, y1), (x2, y2), . . . , (xn, yn) be the vertex coordinates of the polygon in the clockwise direction, respectively, the area S is given by $$-2S = \sum_{i=1}^{n} (x_{i-1} - x_{i+1})y_i \text{ (for } x_0 = x_n, x_{n+1} = x_1) \tag{2}$$

In determination performed by a region inside/outside determination unit 104 with respect to a polygonal region, a point outside the region is connected to an input point with a line segment, and the number of sides of the polygon as the region which the line segment crosses is counted. If the number is odd, it is determined that the input point falls inside the region. If the number is even, it is determined that the input point falls outside the region. If, however, an intersection coincides with a vertex of the polygon, a new point is set outside the region.

More specifically, assume that the input allowable region as a coordinate input region ranges from (x, y)=(0, 0) to (240, 320). In this case, it is calculated whether a line segment which connects a point outside the input allowable region which is defined by (x, y)=(-1, -1) to an input point crosses each side of the polygon. If the sum total of sides which the line segment crosses is odd, it is determined that the input point falls within the region. If this sum total is even, it is determined that the input point falls outside the region.

In addition, the representative point of a polygonal region is calculated by using the average coordinate values of the respective vertex coordinates.

As described above, according to the second embodiment, even if a target region is formed from a polygon, the same effects as those in the first embodiment can be obtained.

Third Embodiment

The first embodiment has exemplified the case wherein the target regions on the coordinate input region are formed from rectangular regions. However, such target regions may be formed from circles and ellipses. The third embodiment will exemplify the processing to be performed when target regions are formed from circles and ellipses.

In the third embodiment, the window shown in FIG. 10 will be described as an operation window example displayed by a tablet PC 100.

Figure 10:
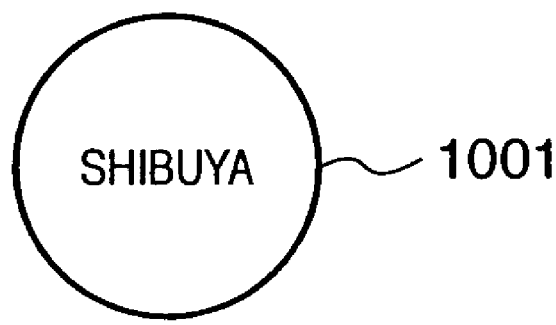
FIG. 10 is a view showing an example of an operation window according to the third embodiment of the present invention.
Figure 10:
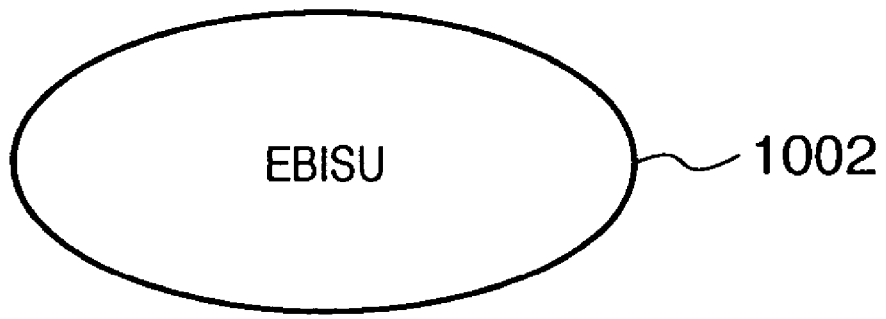

FIG. 10 is a view showing an example of the operation window according to the third embodiment of the present invention.

The operation window in FIG. 10 functions as an operation window for designating a zone or spot. Referring to FIG. 10, in particular, this window is comprised of a circular region 1001 for designating "Shibuya station" and an elliptic region 1002 for designating "Ebisu station".

In addition, contents corresponding to the respective regions which implement this operation window include a grammar which allocates the descriptions of semantic interpretations to the respective regions as shown in FIG. 11.

An example of the grammar which allocates the descriptions of semantic interpretations to the regions in the contents which implement the operation window in FIG. 10 will be described with reference to FIG. 11.

FIG. 11 is a view showing an example of the grammar which allocates the descriptions of semantic interpretations to the regions according to the third embodiment of the present invention.

A description of portions common to the grammar in FIG. 4 in the first embodiment will be omitted.

Referring to FIG. 11, reference numeral 1101 denotes a description indicating a circular region with central coordinates (cx, cy)=(100, 100) and radius r=10. The description of the semantic interpretation "tag="$station='shibuya'"" is allocated to this region.

This description means that when a user's input is intended to indicate this region, it is interpreted that the user "has indicated Shibuya station".

Referring to FIG. 11, reference numeral 1102 denotes a description indicating an elliptic region with central coordinates (cx, cy)=(100, 130), radius rx in x-axis direction=20, and radius ry in y-axis direction=10. The description of the semantic interpretation "tag="$station='ebisu'"" is allocated to this region.

This description means that when a user's input is intended to indicate this region, it is interpreted that the user "has indicated Ebisu station".

In the third embodiment, when the processing in FIG. 5 in the first embodiment is to be performed, processing for circular and elliptic regions is also executed.

Processing to be performed when circular and elliptic regions are processed will be described with reference to FIG. 5.

First of all, an area calculation unit 105 calculates an area Sc of the circular region on the basis of the value of r in the grammar. That is, the area calculation unit 105 calculates Sc=pr2.

In determination performed by the region inside/outside determination unit 104 with respect to the circular region, an input point (xi, yi) is substituted into circle equation C(x, y)=(x−x0)2+(y−y0)2=r2((x0, y0) is the center of the circle). If C(xi, yi)≦r2, it is determined that the input point falls inside the region. If C(xi, yi)>r2, it is determined that the input point falls outside the region.

In this case, the center of the circular region is regarded as the representative point of the circular region.

The area calculation unit 105 calculates an area Se of the elliptic region on the basis of the radius in the x-axis direction and the radius in the y-axis direction. That is, the area calculation unit 105 calculates Se=p×rx×ry.

In determination performed by the region inside/outside determination unit 104 with respect to the elliptic region, the input point (xi, yi) is substituted into ellipse equation e(x, y)=(x−x0)2/rx2+(y−y0)2/ry2=1((x0, y0) is the center of the ellipse). If e(xi, yi)≦1, it is determined that the input point falls inside the region. If e(xi, yi)>1, it is determined that the input point falls outside the region.

In this case, the center of the elliptic region is regarded as the representative point of the elliptic region.

In the processing for the elliptic region, when the distance between the input point coordinates and the representative point of the target region is to be calculated, distance calculation should be performed in consideration of the expansions (shapes) in the x-axis and y-axis directions which are defined by the elliptic region.

Figure 12A:
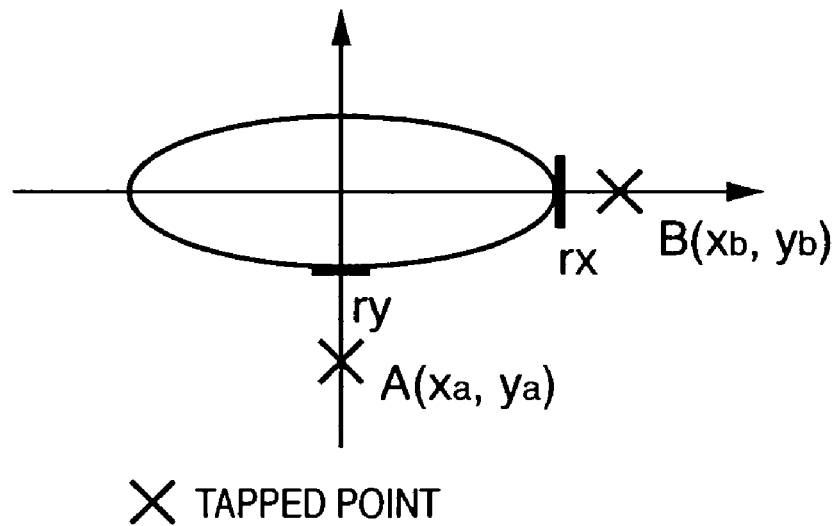
FIG. 12A is a view showing an example of a correction method for the distance between a point located outside a region and a representative point when an input target region is elliptic according to the third embodiment of the present invention.

Referring to the ellipse in FIG. 12A, when points A and B which are input points are compared with each other, the point B may be erroneously interpreted to be closer to the region in spite of the fact that the point A is closer to the center of the ellipse which is the representative point. In order to solve this problem, the coordinates of the respective input points are converted as follows.

Figure 12B:
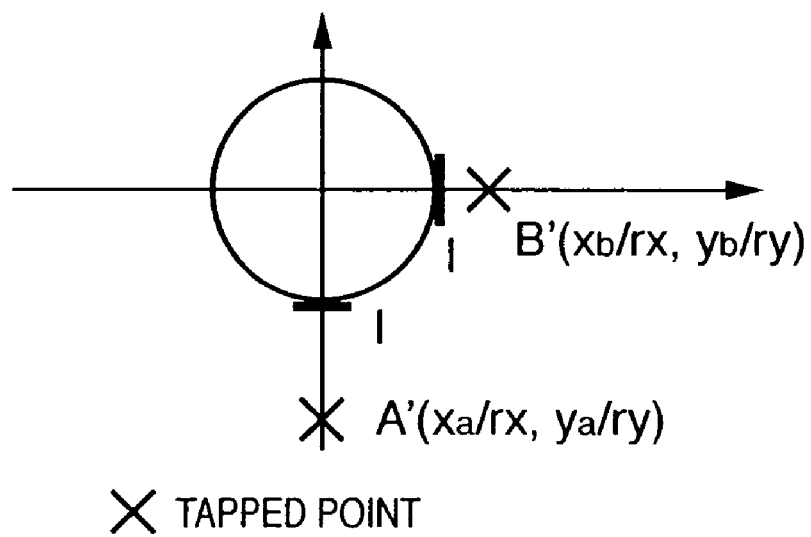
FIG. 12B is a view showing an example of a correction method for the distance between a point located outside a region and a representative point when an input target region is elliptic according to the third embodiment of the present invention.

Letting (x, y)=(xi, yi) be the input point coordinates, rx be the radius of the ellipse in the x-axis direction, and ry be the radius in the y-axis direction, the coordinates are converted into (x, y)=(xi/rx, yi/ry) as shown in FIG. 12B. Each confidence score is then calculated by applying the distance between the converted coordinates and the center of the ellipse as the representative point of the target region to equation (1).

As described above, according to the third embodiment, in addition to the effects described in the first embodiment, the following effect can be obtained. When there is a possibility of erroneous interpretation of the intention of an input depending on the shape of a target region, more accurate confidence scores can be calculated without being influenced by the shape of a target region by converting input point coordinates in accordance with the ratio of the distances between the representative point of the region and boundary points and then calculating the distances between the representative point and the input coordinate points.

Fourth Embodiment

In the third embodiment, when a target region is elliptic, the method of performing distance calculation upon conversion of input point coordinates on the basis of the distances defining the shape of the ellipse is used as a method of performing distance calculation in consideration of the expansions of the ellipse. However, a confidence score may be calculated by using the distance between an input point and the contour (shape) of a target region.

For example, the distance between an input point and the contour of a target region is calculated by the following method. The coordinates of the intersection between a line segment which connects the center of the ellipse and the input point and the ellipse, which is the contour of the target region, are calculated first. The distance between the intersection coordinates and the center of the ellipse is then subtracted from the distance between the center of the ellipse and the input point coordinate, thus performing distance calculation.

Fifth Embodiment

In the first to fourth embodiments, an input is designated by a point. However, an input may be designated by a region having a predetermined range, e.g., a circle. In this case, a confidence score is calculated by using the area of a target region included in an input range or the distance between the representative point of an input range and the representative point of a target region.

Figure 13A:
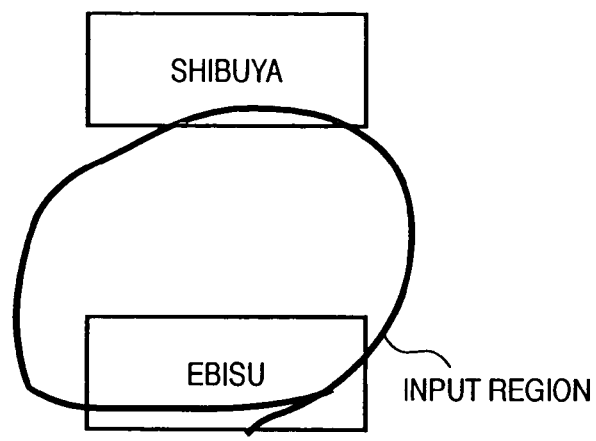
FIG. 13A is a view for explaining the processing to be performed when input operation is performed by designating a predetermined range according to the fifth embodiment of the present invention.
Figure 13B:
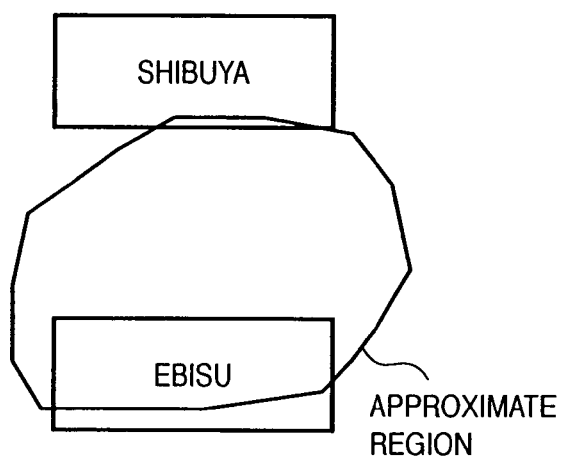
FIG. 13B is a view for explaining the processing to be performed when input operation is performed by designating the predetermined range according to the fifth embodiment of the present invention.
Figure 13C:
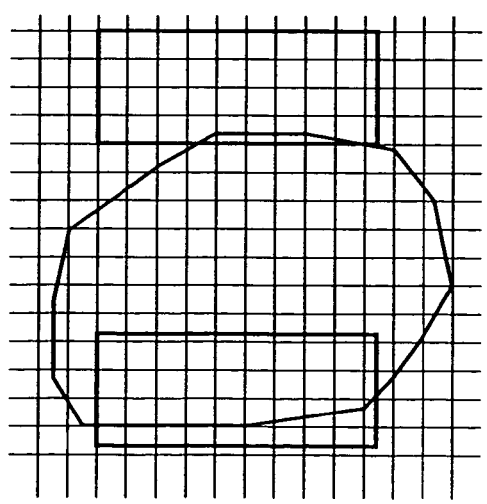
FIG. 13C is a view for explaining the processing to be performed when input operation is performed by designating the predetermined range according to the fifth embodiment of the present invention.

When, for example, an input is designated by an input region like that shown in FIG. 13A, the input region is converted into a polygonal approximate region as shown in FIG. 13B, and a confidence score of a given region is calculated by calculating the number of intersections of lattice points in the region like those shown in FIG. 13C.

As described above, according to the fifth embodiment, even when an input having a predetermined range is made, effects similar to those of the first embodiment can be obtained.

Sixth Embodiment

Although the first to fifth embodiments have exemplified the flat, two-dimensional coordinate space in which input operation is performed, the present invention can also be applied to a three-dimensional coordinate space.

Seventh Embodiment

The first to sixth embodiments are configured to calculate the confidence scores of all the M regions in the contents. However, each embodiment may be configured to reduce the calculation amount by limiting the number of regions as calculation targets in accordance with applications and purposes. When, for example, the position indicated by a user falls outside a region and is separated from the representative point of the region by a predetermined threshold or more, the region may be excluded from confidence score calculation targets to omit (inhibit) the calculation of a confidence score.

Eighth Embodiment

Each embodiment described above has exemplified the case wherein programs are held in the ROM. However, the present invention is not limited to this. Each embodiment may be implemented by using an arbitrary storage medium other than a ROM or may be implemented by using a circuit operates in the same manner as a ROM.

The embodiments have been described in detail above. The present invention can take various forms including a system, apparatus, method, program, storage medium, and the like. More specifically, the present invention can be applied to a system constituted by a plurality of devices, or to an apparatus comprising a single device.

The present invention incorporates a case wherein programs of software for implementing the functions of the embodiments described above (programs corresponding to the flowchart shown in the accompanying drawing in the embodiments) are directly or remotely supplied to a system or apparatus to cause the computer of the system or apparatus to read out and execute the programs, thereby implementing the functions.

The program codes themselves which are installed in the computer to allow the computer to implement the functions/processing of the present invention also realize the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a home page on the Internet by using a browser to download each computer program of the present invention itself from the home page or download a compressed file containing an automatic install function into a recording medium such as a hard disk. Alternatively, the programs can be supplied by dividing the program codes constituting each program of the present invention into a plurality of files, and downloading the respective files from different home pages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a home page through the Internet, executing the encrypted programs using the key information, and allowing a computer to install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-401632 filed on Dec. 1, 2003, the entire contents of which are hereby incorporated by reference herein.

What is claimed is:

1. An information processing apparatus comprising:
display control means for controlling to display a plurality of regions on a display area;
detection means for detecting an input point of an input to the display area;
calculation means for calculating confidence scores for each of the plurality of regions;
output means for outputting information corresponding to each of the plurality of regions on the basis of the confidence scores, and
selection means for selecting one of information corresponding each of the plurality of regions;
wherein for each of the plurality of regions, the respective confidence score is calculated using a distance between a representative point and the input point detected by said detection means, regardless of whether the input point is included in the region, the representative point being a center or a center of gravity of the region, and
wherein when calculating a confidence score for a region, of the plurality of regions, in which distances between the representative point of the region and boundary points of the region vary, said calculation means calculates the confidence scores by converting input point coordinates on the basis of the ratio of the distances between the representative point of the region and the boundary points of the region, and calculating distance between the representative point of the region and the converted input point coordinates.

2. The apparatus according to claim 1, wherein said calculation means further calculates the confidence score on the basis of a size of the region.

3. The apparatus according to claim 2, wherein said calculation means further calculates the confidence score on the basis of a size of a smallest region among the plurality of regions.

4. The apparatus according to claim 1, further comprising determination means for determining whether the input position of the input point detected by said detection means falls inside or outside the region,
wherein said calculation means calculates the confidence score on the basis of the determination result obtained by said determination means.

5. The apparatus according to claim 1, further comprising decision means for deciding the representative point of the region,
wherein the positional relationship between the region and the input position of the input point detected by said detection means is a distance between the input position and the representative point decided by said decision means.

6. The apparatus according to claim 1, further comprising second display control means for controlling to display information corresponding to the region on the basis of the confidence score output from said output means.

7. The apparatus according to claim 1, further comprising reference means for referring to input interpretation information including a description concerning the plurality of regions,
wherein said calculation means calculates the confidence score on the basis of a relationship between the input and the region which is acquired by using the input interpretation information referred to by said reference means.

8. An information processing method comprising:
a display control step of controlling to display a plurality of regions on a display area;
a detection step of detecting an input point of an input to the display area;
a calculation step of calculating confidence scores for each of the plurality of regions;
an output step of outputting information corresponding to each of the plurality of regions on the basis of the confidence scores, and
a selection step of selecting one of information corresponding each of the plurality of regions;
wherein for each of the plurality of regions, the respective confidence score is calculated using a distance between a representative point and the input point detected in the detection step, regardless of whether the input point is included in the region, the representative point being a center or a center of gravity of the region, and
wherein when calculating a confidence score for a region, of the plurality of regions, in which distances between the representative point of the region and boundary points of the region vary, said calculation step calculates the confidence scores by converting input point coordinates on the basis of the ratio of the distances between the representative point of the region and the boundary points of the region, and calculating distance between the representative point of the region and the converted input point coordinates.

9. A computer-executable program stored in a computer-readable memory, the program comprising code for causing a computer to execute the steps of:
a display control step of controlling to display a plurality of regions on a display area;
a detection step of detecting an input point of an input to the display area;
a calculation step of calculating confidence scores for each of the plurality of regions;
an output step of outputting information corresponding to each of the plurality of regions on the basis of the confidence scores, and
a selection step of selecting one of information corresponding each of the plurality of regions;
wherein for each of the plurality of regions, the respective confidence score is calculated using a distance between a representative point and the input point detected in the detection step, regardless of whether the input point is included in the region, the representative point being a center or a center of gravity of the region, and
wherein when calculating a confidence score for a region, of the plurality of regions, in which distances between the representative point of the region and boundary points of the region vary, said calculation step calculates the confidence scores by converting input point coordinates on the basis of the ratio of the distances between the representative point of the region and the boundary points of the region, and calculating distance between the representative point of the region and the converted input point coordinates.

10. A computer readable storage medium storing a program defined in claim 9.

* * * * *